Feb. 20, 1923.
T. C. WILLSON.
PHOTOGRAPHIC PRINTING DEVICE.
FILED JAN. 24, 1921.
1,445,987.
2 SHEETS—SHEET 1.
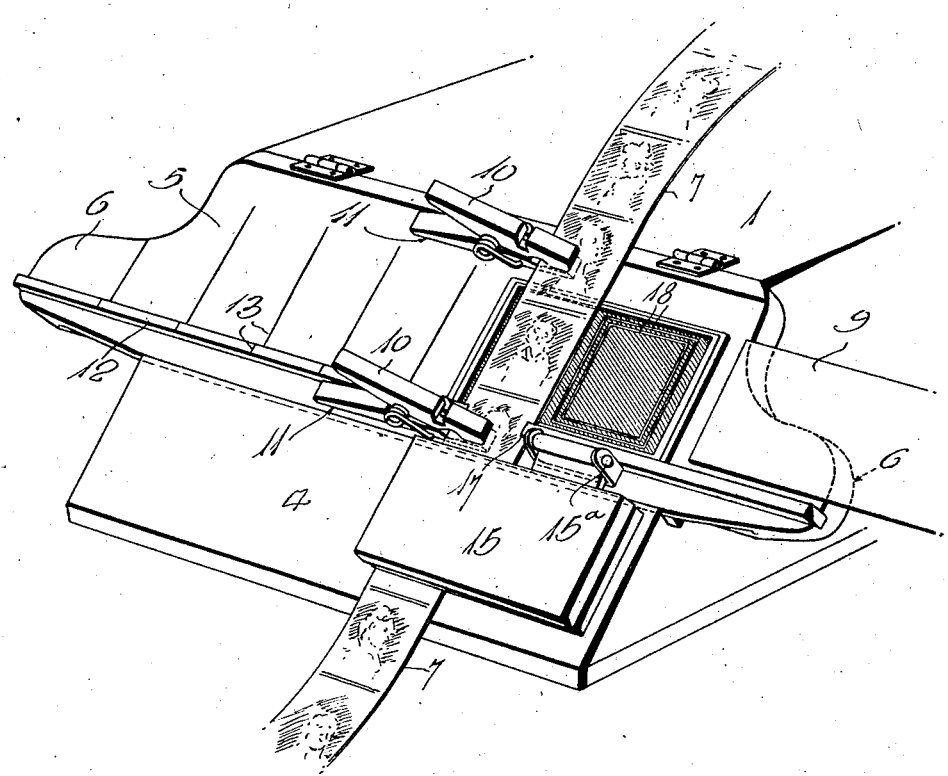
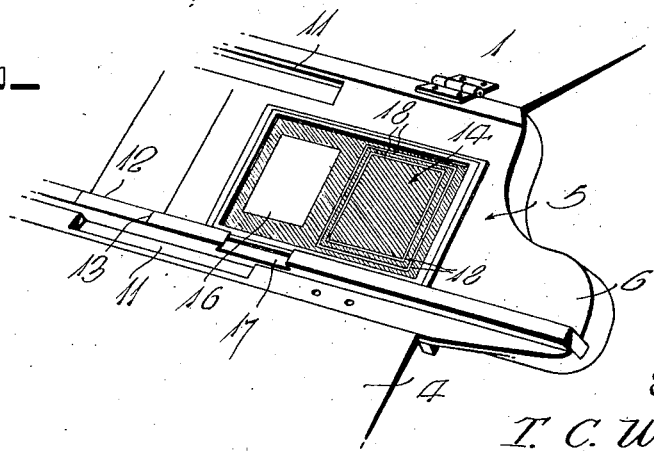
Witness
H. Woodard
Inventor
T. C. Willson
By H. B. Willson & Co.
Attorneys Feb. 20, 1923.
T. C. WILLSON.
PHOTOGRAPHIC PRINTING DEVICE
FILED JAN. 24, 1921.
1,445,987.
2 SHEETS—SHEET 2.
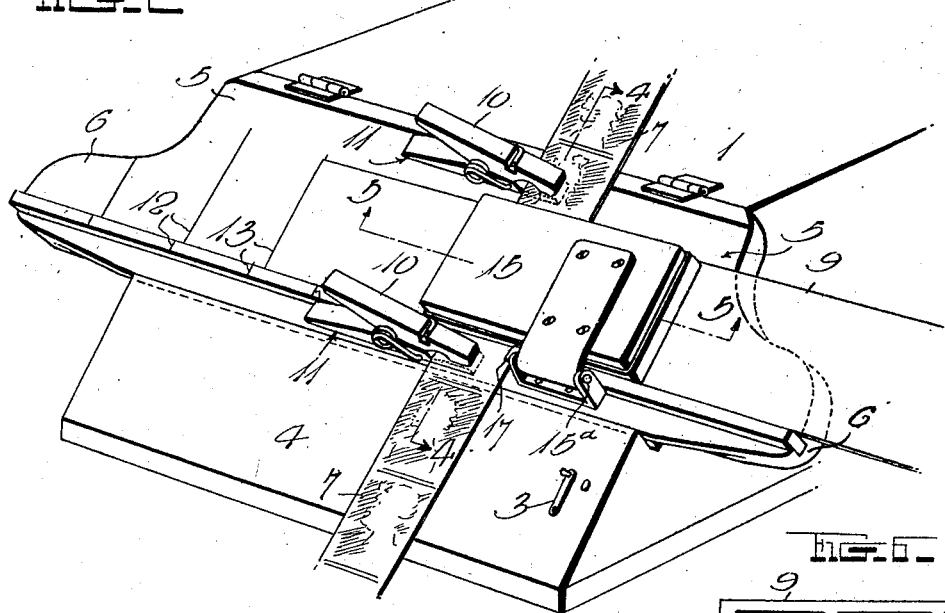
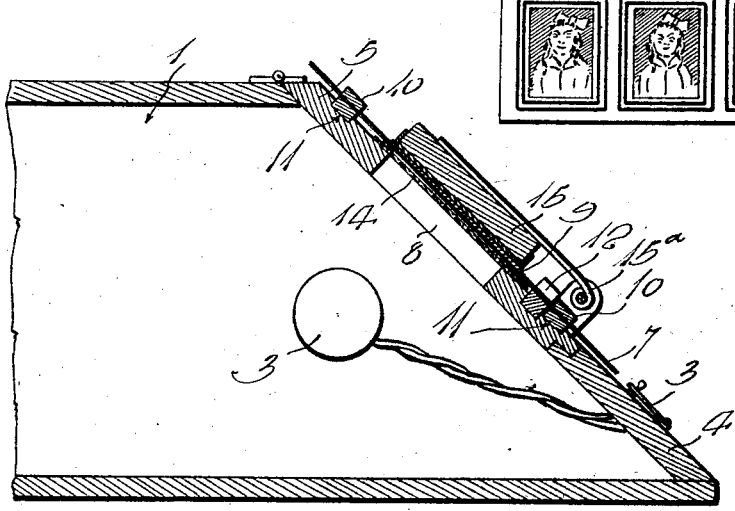
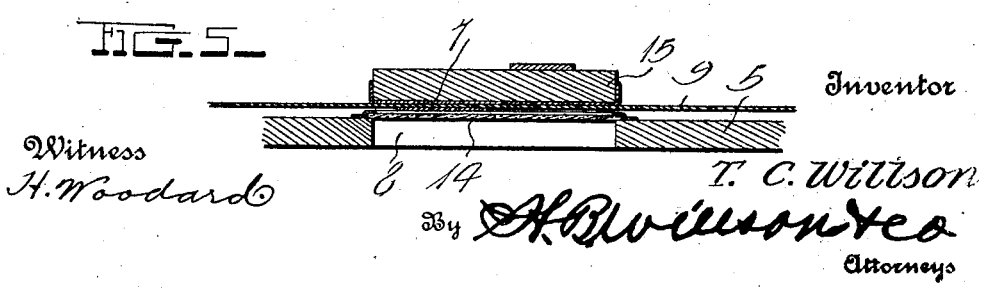
Witness
H. Woodard
Inventor
T. C. Willson
By H. B. Willson & Co
Attorneys Patented Feb. 20, 1923.

1,445,987

UNITED STATES PATENT OFFICE.

THOMAS CARROLL WILLSON, OF PHILADELPHIA, PENNSYLVANIA.

PHOTOGRAPHIC-PRINTING DEVICE.

Application filed January 24, 1921. Serial No. 439,594.

*To all whom it may concern:*

Be it known that I, THOMAS CARROLL WILLSON, a citizen of the United States, residing at Philadelphia, in the county of Philadelphia and State of Pennsylvania, have invented certain new and useful Improvements in Photographic-Printing Devices; and I do declare the following to be a full, clear, and exact description of the invention, such as will enable others skilled in the art to which it appertains to make and use the same.

My invention relates to photography and more particularly to the printing of pictures from films or plates, the principal object of the invention being to provide a simple and inexpensive, yet a highly efficient and desirable device for rapidly printing a plurality of duplicate pictures on a single strip of sensitized material, novel provision being made for holding a film strip having different images, so that any of these images may be exposed and a number of pictures printed therefrom.

A further object of the invention is to make novel provision whereby a border for one picture is printed simultaneously with the printing of the next adjacent picture.

With the foregoing in view, the invention resides in the novel construction and arrangement of parts hereinafter described and claimed, the descriptive matter being supplemented by the accompanying drawings.

Figure 1 is a perspective view of a photographic printing device constructed in accordance with my invention, showing a film clamped in place preparatory to positioning a strip of sensitized paper thereover.

Figure 2 is a duplicate of Fig. 1 with the exception that it illustrates the sensitized strip clamped in place upon the film.

Figure 3 is a detail perspective view illustrating more clearly the plate which makes possible the simultaneous printing of one picture and the border for the next adjacent picture.

Figure 4 is a vertical sectional view through the device.

Figure 5 is a detail horizontal sectional view as indicated by line 5—5 of Fig. 2.

Figure 6 is a fragmentary elevation of a picture strip printed by the device.

In the drawings above briefly described, the numeral 1 designates an appropriate lamp box in which is located an electric light 2 controlled by means of an appropriate switch 3 which is preferably located on the inclined front end of the box, which end is shown consisting of a fixed lower section 4 and an upwardly swinging hinged section 5, the ends of the latter being preferably extended beyond the section 4 as indicated at 6, so as to form convenient hand grips by means of which said section 5 may be elevated whenever desired. The section or board 5 forms a support for a film strip 7 or other negative and is provided with an opening 8 through which the rays of light from the lamp 2 may shine through the film onto a strip 9 of printing paper or other sensitized material. As shown clearly in Figs. 1, 2, 3 and 5, the opening 8 extends laterally beyond the film path, this provision being made for a purpose to appear below.

For the purpose of guiding the film strip 7 and securing it in place when it is longitudinally adjusted to position any of its individual images over the opening 8, I provide a pair of spring clips 10 which may well be of the form shown, with their base portions secured in grooves 11 formed in the board 5. When the film is held by the clips 10, the strip of sensitized material 9 is adapted to be successively advanced across said film so that a number of pictures may be printed on said strip 9, from the same image. To guide the strip 9 while it is being fed in this manner, I provide any appropriate means which is here shown in the form of a rib or ledge 12 extending preferably throughout the length of the board 5, and positioned adjacent the lower edge of the opening 8, said ledge and board being preferably provided with indicating marks 13 which are useful in shifting the strip 9 the proper amount after the printing of each picture.

For holding the strips 9 and 7 tightly against each other and in tight contact with a glass plate 14 which covers the opening 8, I provide a felt lined clamping member 15 which at 15ᵃ is pivotally mounted on the board 5 so as to swing downwardly over the crossed portion of the two strips, said member being adapted to be held in place by hand while the light 2 is illuminated to print upon the sensitized strip 9.

As above set forth, the opening 8 extends laterally from the film path and this opening is covered by the glass plate 14. This plate is suitably plated throughout the greater part of its area so as to render it non-transparent. It is provided however with a transparent area 16 through which the rays from the lamp 2 are directed for passage through the film 7 to print a picture on the strip 9, said film being guided accurately over the area 16 by means of a notch 17 in the rib or ledge 12, through which notch the film extends as shown. The portion of the plate 14 at the side of the film path is provided with one or more transparent areas 18 so arranged as to permit rays of light from the lamp 2 to pass therethrough and thereby print a border for one picture, while another picture is being printed on the strip 9. If the area or areas 18 surrounded the area 16, the border would be very dim at the top and bottom of the picture and sharp along the vertical sides thereof, due to the fact that at said top and bottom, the rays would be forced to pass through both of the plate 14 at the film strip, whereas at the sides, the rays would travel only through the plate. It is therefore of great advantage to employ the arrangement shown for printing one picture and simultaneously printing a border for the next adjacent picture.

In operation, a film strip 7 or other negative having a plurality of different images thereon, is passed through the notch 17 and clips 10 and after adjusting to position one of the images over the area 16, is held by said clips. A strip 9 of printing paper or other sensitized material is now placed over the portion of the glass 14 which projects beyond the film. This having been done, the clamping member 15 is swung downwardly and held by hand while the high-powered lamp 2 is momentarily illuminated. The rays from the lamp are projected through the area or areas 18 and thus print a border on the strip 9. When the current is turned off from the lamp 2, the strip 9 is fed inwardly across the film strip 7 so that the previously printed border is positioned around the image on the film. This having been done, the two strips 7 and 9 are properly held against each other by the clamping member 15 and the lamp 2 is again illuminated. This causes a picture to be printed on the strip 9 within the border previously made, and also causes the simultaneous printing of a border for the next adjacent picture. This operation is repeated successively until the desired number of pictures have been printed and if the row of pictures is to extend entirely from end to end of the strip 9, the last printing operation will of course form a picture in the previously formed border.

Since excellent results have been obtained from the several details shown and described, these details may be followed if desired. I wish it understood however that within the scope of the invention as claimed, numerous changes may be made. Furthermore, although I intend in most instances to employ a film strip, it will be understood that an elongated glass negative could be substituted. Furthermore, although the strip 9 is in most cases formed of ordinary printing paper, it might be in the form of an elongated sensitized plate.

I claim:

1. A photographic printing device comprising a supporting board having an opening and a transparent plate thereover, film holding clips on said board at opposite sides of said opening and adapted to hold a film in place on said plate, a rib on said board extending along one of said sides of the opening and adapted to guide a strip of sensitized material across the film, and a clamping member pivotally mounted on said board to be swung over the crossed portion of the film and strip to hold them in place on said plate while directing light rays through the latter.

2. A photographic printing device comprising a supporting plate for a film and a strip of sensitized material, said plate having a transparent portion through which light rays may pass to the film to print a picture on the sensitized strip, said plate also having at one side of said transparent area, a transparent portion adapted to print a border for the next picture while one picture is being printed.

3. A photographic printing device comprising a plate on which a film is adapted to rest, and guiding means along which a strip of sensitized material is adapted to be successively advanced across the film, said plate having a transparent area through which light rays from the film may pass to print a picture on the sensitized strip, said plate being additionally provided at one side of said transparent area, with a transparent portion adapted to print a border for the next picture while one picture is being printed.

4. A structure as specified in claim 1; said plate having a transparent area located on the film path and being additionally provided at a point spaced laterally from said film path, with a transparent portion adapted to print a border on the sensitized strip.

In testimony whereof I have hereunto set my hand.

THOMAS CARROLL WILLSON.